J. P. PONCE.
Automatic Gates.

No. 138,283. Patented April 29, 1873.

UNITED STATES PATENT OFFICE.

JOSEPH P. PONCE, OF MAYFIELD, CALIFORNIA, ASSIGNOR TO HIMSELF AND JOHN MILLER, OF SAME PLACE.

IMPROVEMENT IN AUTOMATIC GATES.

Specification forming part of Letters Patent No. 138,283, dated April 29, 1873; application filed September 2, 1872.

*To all whom it may concern:*

Be it known that I, JOSEPH P. PONCE, of Mayfield, county of Santa Clara, State of California, have invented an Improved Farm-Gate; and I do hereby declare the following description and accompanying drawing are sufficient to enable any person skilled in the art or science to which it most nearly appertains to make and use my said invention or improvement without further invention or experiment.

My invention relates to an improved construction and arrangement in that class of farm-gates which can be opened by a person approaching it upon either side, and closed behind him, without the necessity of his dismounting from his horse or vehicle; and it consists in the employment of a simple system of levers by which the gate can be swung in either direction, according to the manner of operating the levers.

In order to more fully illustrate and explain my invention, reference is had to the accompanying drawing forming a part of this specification, in which—

Figure 1:
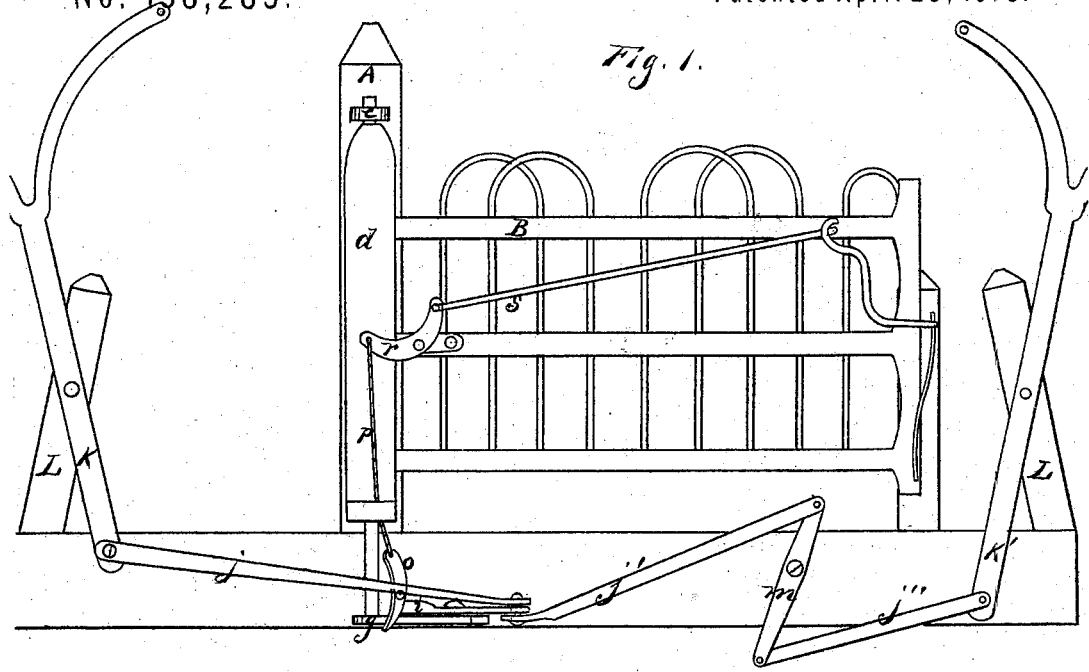
Figure 2:
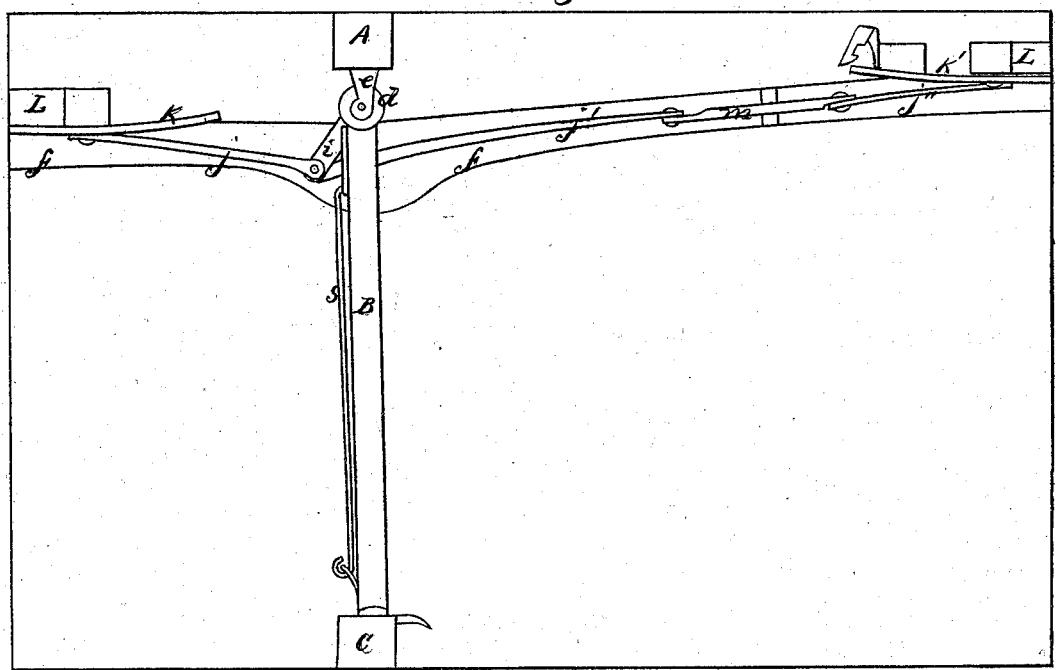
Figure 3:
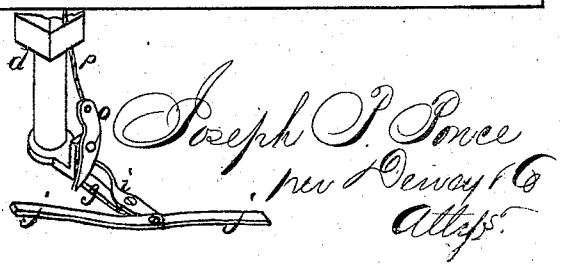

Figure 1 is a view showing the gate opened, and a section of the road-bed, showing the operating mechanism of the gate. Fig. 2 is a plan. Fig. 3 is a perspective view of the latching device.

A represents the upright posts, to which the gate B is hinged, and C the post against which the gate closes. The end post $d$ of the gate is extended below the surface of the ground, and steps in a timber which is buried transversely across the gate-way, near the post A, while its upper end is provided with a journal which works in the end of an arm, $e$, extending out from the post A. A channel or narrow ditch, F, is formed across the gate-way, extending a short distance to each side of the gate, passing along near the lower end of the post $d$. This ditch can be formed of boards or timber, and can be covered over, if desired, in order not to obstruct the gate-way, and to prevent the ditch from filling up. An arm, $g$, is secured to the lower end of the post $d$, below the ground, which extends into the ditch F. A small lever-bar, $i$, is loosely attached to the end, and upon the upper side of the arm $g$, at its middle, and serves to unlatch the gate, in the manner hereinafter described, when the gate is being opened. To the outer extremity of this bar $i$ two connecting-rods, $j\,j$, are attached by a bolt, one above and one below, the two extending in opposite directions in the ditch F, as shown. The opposite end of the rod $j$ is attached to the lower end of an upright lever, K, and this lever K is pivoted at its middle to the upright post L. The rod $j'$ extends along the ditch on the opposite side of the gate, and has its opposite end attached to one end of a centrally-pivoted rocking-lever, $m$. The opposite end of the lever $m$ is connected by a rod, $j''$, with the lower end of an upright lever, K', which is also pivoted at its middle to an upright post, L.

By drawing upon the upper end of either of the levers K or K', in direction away from the gate, the series of levers draw upon the small lever-bar $i$ and arm $g$ so as to swing the gate open in one direction. The reverse movement closes the gate.

The upper end of the levers K K' is separated into two arms, which are bent in opposite directions, and a cord can be attached to each of the arms, by which the levers can be operated at a distance, as desired.

A short lever, $o$, is centrally pivoted to a standard on the arm $g$, so that its lower end will be tripped by the inner end of the lever-bar $i$ when the levers are operated to open the gate. A wire or cord, $p$, is attached to the upper end of this lever, and extends up along the gate-post, and is attached to one end of a bell-crank, $r$. The rod $s$, which operates the latch, is attached to the opposite end of the bell-crank, so that when either of the levers K K' are drawn upon the arm $i$ trips the lever $o$ and causes it to pull upon the bell-crank, and thus unlatch the gate.

By this means I provide a simple and effective apparatus for opening and closing a gate which cannot easily get out of order.

Having thus described my invention, what

I claim, and desire to secure by Letters Patent, is—

1. The gate B with its extended post $d$ bearing in a timber below the surface of the road, and having the fixed arm $g$, in combination with the rods $j\, j'\, j''$, centrally-pivoted rocking-lever $m$, and upright levers K K', all connected and arranged as and for the purpose above described.

2. In combination with the arm $g$ and levers $j\, j'$, the short levers $i\, o$, cord $p$, and bell-crank $r$, substantially as and for the purpose above described.

In testimony whereof I hereunto set my hand and seal.

J. P. PONCE. [L. S.]

Witnesses:
 J. L. McKibben,
 Joseph Kaufman.